United States Patent
Luo et al.

(10) Patent No.: US 12,381,679 B2
(45) Date of Patent: Aug. 5, 2025

(54) REFERENCE SIGNAL NOTIFICATION METHOD AND APPARATUS

(71) Applicant: HUAWEI TECHNOLOGIES CO., LTD., Shenzhen (CN)

(72) Inventors: Jun Luo, Shanghai (CN); Zhengzheng Xiang, Shanghai (CN); Jin Liu, Shenzhen (CN); Pu Yuan, Shenzhen (CN); Kelvin Kar Kin Au, Ottawa (CA); Keyvan Zarifi, Ottawa (CA); Mohammadhadi Baligh, Ottawa (CA); Amine Maaref, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/666,325

(22) Filed: May 16, 2024

(65) Prior Publication Data
US 2024/0388394 A1    Nov. 21, 2024

Related U.S. Application Data

(63) Continuation of application No. 16/673,217, filed on Nov. 4, 2019, now Pat. No. 12,003,442, which is a (Continued)

(30) Foreign Application Priority Data

May 5, 2017    (CN) .......................... 201710314205.0
May 12, 2017    (CN) .......................... 201710335918.5

(51) Int. Cl.
*H04L 5/00*    (2006.01)
*H04B 7/06*    (2006.01)
(Continued)

(52) U.S. Cl.
CPC ......... *H04L 5/0048* (2013.01); *H04B 7/0626* (2013.01); *H04B 17/327* (2015.01); (Continued)

(58) Field of Classification Search
CPC ... H04L 5/0048; H04B 17/327; H04B 7/0626; H04W 36/0085; H04W 24/10; H04W 56/0055
See application file for complete search history.

(56) References Cited

U.S. PATENT DOCUMENTS

2014/0177601 A1    6/2014    Nishio et al.
2017/0366244 A1    12/2017    Lee et al.
(Continued)

FOREIGN PATENT DOCUMENTS

CN    102340801 A    2/2012
CN    102696183 A    9/2012
(Continued)

OTHER PUBLICATIONS

"Draft Report of 3GPP TSG RAN WG1 #AH1_NR v0.1.0 (Spokane, USA, Jan. 16-20, 2017)" (Year: 2017).*
(Continued)

*Primary Examiner* — Joseph A Bednash
(74) *Attorney, Agent, or Firm* — Fish & Richardson P.C.

(57) ABSTRACT

Embodiments of the present invention provide a reference signal notification method, including: sending, by a network device, a reference signal notification message, where the reference signal notification message includes time resource information of a reference signal. According to the embodiments of the present invention, the reference signal notification message in the present invention is used to notify UE of a reference signal configuration, especially information about a CSI-RS, so that the network device can flexibly provide a reference signal, especially a CSI-RS, and the UE
(Continued)

can more effectively receive the reference signal, especially the CSI-RS.

20 Claims, 9 Drawing Sheets

Related U.S. Application Data continuation of application No. PCT/CN2018/085191, filed on Apr. 28, 2018.

(51) Int. Cl.
*H04B 17/327* (2015.01)
*H04W 24/10* (2009.01)
*H04W 36/00* (2009.01)
*H04W 56/00* (2009.01)

(52) U.S. Cl.
CPC ....... *H04W 24/10* (2013.01); *H04W 36/0085* (2018.08); *H04W 56/0055* (2013.01)

(56) References Cited

U.S. PATENT DOCUMENTS

| | | |
|---|---|---|
| 2018/0115940 A1 | 4/2018 | Abedini et al. |
| 2018/0317114 A1 | 11/2018 | Kim et al. |
| 2019/0379431 A1 | 12/2019 | Park et al. |
| 2020/0029229 A1 | 1/2020 | Harada et al. |
| 2020/0053738 A1 | 2/2020 | Harada et al. |
| 2020/0112355 A1 | 4/2020 | Park et al. |
| 2020/0112969 A1 | 4/2020 | Dai |
| 2020/0145981 A1 | 5/2020 | Harada et al. |

FOREIGN PATENT DOCUMENTS

| | | |
|---|---|---|
| CN | 103138869 A | 6/2013 |
| CN | 104052532 A | 9/2014 |
| WO | 2013085150 A1 | 6/2013 |
| WO | 2016099079 A1 | 6/2016 |
| WO | 2017062061 A1 | 4/2017 |

OTHER PUBLICATIONS

Samsung, "CSI-RS for beam management". 3GPP TSG RAN WG1#88, Spokane, USA, Apr. 3-7, 2017, R1-1705351 (Year: 2017).*
Nokia et al., "CSI-RS for mobility purposes", 3GPP TSG-RAN WG1 Meeting #88bis, Spokane, WA, USA, Apr. 3-7, 2017, R1-1706843 (Year: 2017).*
3GPP TR 38.912,V14.0.0, "3rd Generation Partnership Project, Technical Specification Group Radio Access Network, Study on New Radio (NR) access technology (Release14)",Mar. 24, 2017, 74 pages.
3GPP TS 38.331 V0.0.2, "3rd Generation Partnership Project; Technical Specification Group Radio Access Network; NR; Radio Resource Control (RRC) and Protocol specification (Release 15)," Mar. 2017, 13 pages.
MCC Support., "Draft Report of 3GPP TSG RAN WG1 #AH1_NR v0.1.0," Spokane, USA, Jan. 16-20, 2017, 105 pages.
Extended European Search Report issued in European Application No. 18794533.2 on Mar. 20, 2020, 8 pages.
Nokia et al., "On CSI-RS Design for DL Beam Management," 3GPP TSG RAN WG1 NR Ad-Hoc Meetin, R1-1701102, Spokane, USA, Jan. 9, 2017, 15 pages.
Nokia et al.,"CSI-RS for mobility purposes," 3GPP TSG-RAN WG1 Meeting #88bis, R1-1705843, Spokane, WA, USA, Apr. 3-7, 2017, 6 pages.
Nokia et al.,"DL Signals for Mobility Measurements in NR and Mobility schemes," 3GPP TSG-RAN WG1#88, R1-1703097, Athens, Greece, Feb. 13-17, 2017, 12 pages.
NTT Docomo, Inc., "Discussion on CSI-RS configuration for NR RRM measurement in Connected mode," 3GPP TSG RAN WG1 Meeting #88bis, R1-1705713, Spokane, USA, Apr. 3-7, 2017, 5 pages.
Office Action issued in Chinese Application No. 201710335918.5 on Jun. 23, 2022, 25 pages (with English translation).
PCT International Search Report and Written Opinion in International Application No. PCT/CN2018/085,191, dated Jul. 4, 2018, 20 pages (With English Translation).
Samsung, "CSI-RS for beam management," 3GPP TSG RAN WG1 #88, Spokane, USA, Apr. 3-7, 2017, R1-1705351, 7 pages.
3GPP TS 38.300 V0.2.0, "3rd Generation Partnership Project; Technical Specification Group Radio Access Network; NG Radio Access Network; Overall Description; Stage 2(Release 15)," May 2017, 33 pages.

* cited by examiner

REFERENCE SIGNAL NOTIFICATION METHOD AND APPARATUS

CROSS-REFERENCE TO RELATED APPLICATIONS

This application is a continuation of U.S. patent application Ser. No. 16/673,217, filed on Nov. 4, 2019, which is a continuation of International Application No. PCT/CN2018/085191, filed on Apr. 28, 2018, which claims priority to Chinese Patent Application No. 201710314205.0, filed on May 5, 2017, and Chinese Patent Application No. 201710335918.5, filed on May 12, 2017. All of the aforementioned patent applications are hereby incorporated by reference in their entireties.

TECHNICAL FIELD

The present invention relates to the communications field, and in particular, to a reference signal notification method and apparatus.

BACKGROUND

In a method for radio resource management (English full name: Radio Resource Management, RRM for short) in an existing LTE system, a measurement manner based on a downlink signal is used. To be specific, a base station sends a downlink reference signal, for example, a cell specific reference signal (English full name: Cell Specific Reference Signal, CRS for short) at a fixed time-frequency location. UE measures the reference signal sent by the base station to obtain a measurement result such as reference signal received power (English full name: Reference Signal Received Power, RSRP for short)/reference signal received quality (English full name: Reference Signal Received Quality, RSRQ for short), and reports the measurement result to the base station; and the base station determines a handover and movement of the UE (UE for short).

A cell handover is an important process in a wireless network, and plays a very key role in ensuring wireless communication quality of the UE. For example, in an LTE wireless network, a base station in each cell sends a reference signal CRS. UE in a cell receives a reference signal sent by a base station in the current cell and a reference signal sent by a base station in a neighboring cell, and reports received reference signal quality information such as RSRP to the base station in the current cell. The base station in the current cell determines, based on the information reported by the UE, whether the UE is to be handed over to another cell. For example, when RSRP, received by the UE, of the reference signal sent by the base station in the neighboring cell is greater than RSRP, received by the UE, of the reference signal sent by the base station in the current cell, the base station may send signaling to instruct the UE to be handed over to the neighboring cell, and make handover preparations and migrate data of the UE with the base station in the neighboring cell. After receiving a handover instruction, the UE performs handover confirmation with the base station in the neighboring cell and initiates initial access. The UE may start to perform normal communication after successfully accessing the base station in the neighboring cell. FIG. 1 is a schematic diagram of a cell handover process. In the cell handover process, reference signal measurement is a relatively important step. However, only a fixed measurement manner based on a downlink reference signal is used in the existing LTE system, and consequently there are excessively high overheads on a network side. Therefore, there is a disadvantage that a detection manner for UE is not flexible enough.

SUMMARY

To resolve a technical problem, embodiments of the present invention provide a reference signal notification method and apparatus.

According to a first aspect, an embodiment of the present invention provides a reference signal notification method, including: sending, by a network device, a reference signal notification message, where the reference signal notification message includes time resource information of a reference signal.

According to a second aspect, an embodiment of the present invention provides a reference signal notification method, including: receiving, by a terminal device, a reference signal notification message, where the reference signal notification message includes time resource information of a reference signal.

According to a third aspect, an embodiment of the present invention provides a reference signal notification apparatus, including: a transceiver, where the transceiver is configured to send a reference signal notification message, where the reference signal notification message includes time resource information of a reference signal.

According to a fourth aspect, an embodiment of the present invention provides a reference signal notification apparatus, including: a transceiver, where the transceiver is configured to receive a reference signal notification message, where the reference signal notification message includes time resource information of a reference signal.

According to a fifth aspect, this application provides a computer readable storage medium, including an instruction. When the instruction runs on a computer, the computer performs the reference signal notification method according to the first aspect.

According to a sixth aspect, this application provides a computer readable storage medium, including an instruction. When the instruction runs on a computer, the computer performs the reference signal notification method according to the second aspect.

According to the embodiments of the present invention, the reference signal notification message in the present invention is used to notify UE of a reference signal configuration, especially information about a CSI-RS, so that the network device can flexibly provide a reference signal, especially a CSI-RS, and the UE can more effectively receive the reference signal, especially the CSI-RS.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

Figure 1:
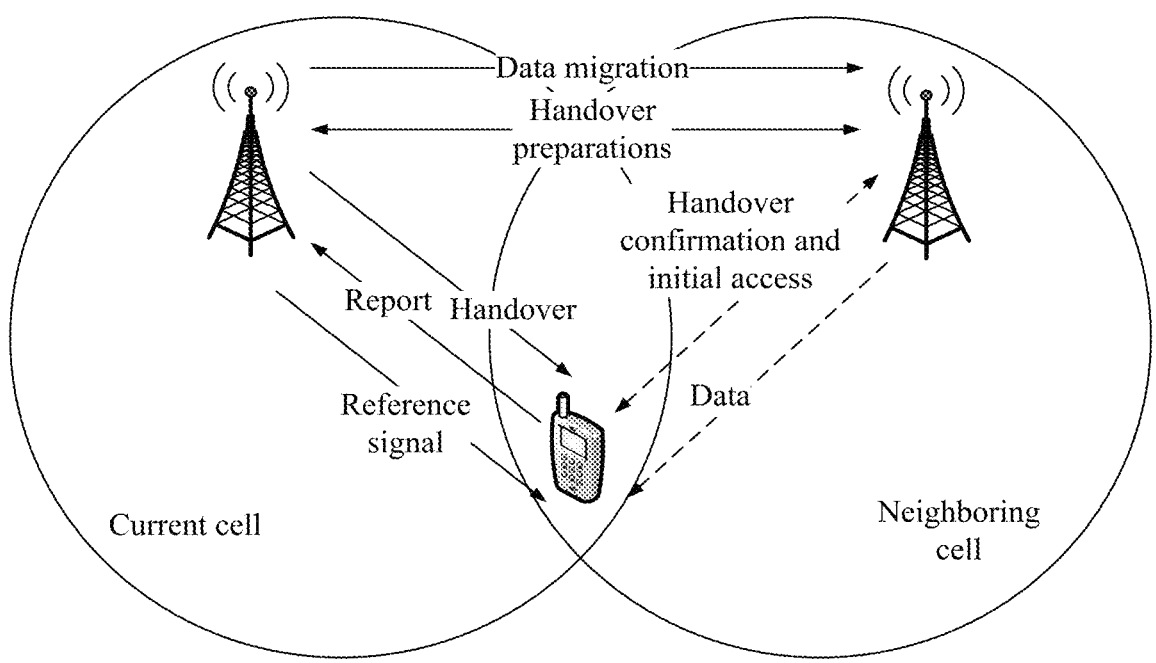
FIG. 1 shows an example of a handover process in LTE.
Figure 2:
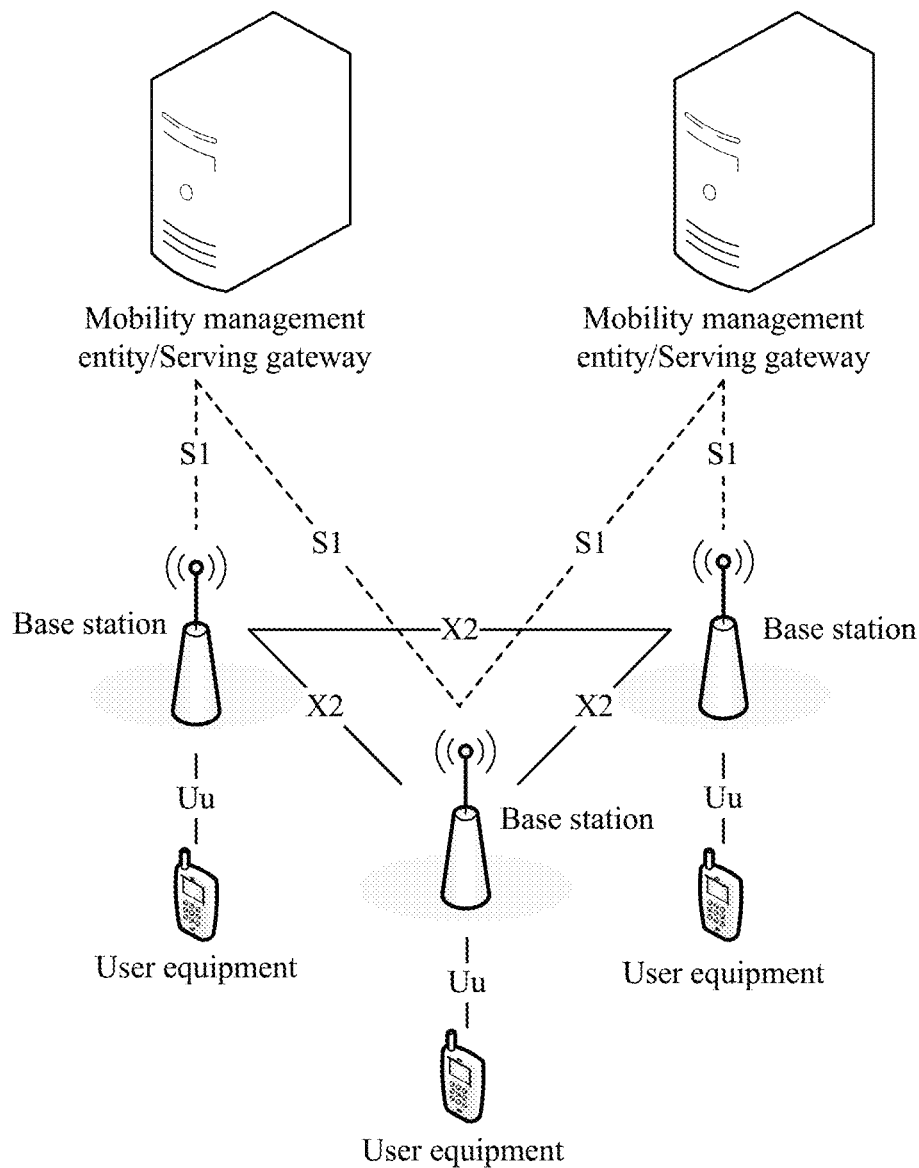
FIG. 2 is a schematic diagram of an example of a network architecture that may be applied to an embodiment of the present invention.

FIG. 2 is a schematic diagram of an example of a network architecture that may be applied to an embodiment of the present invention. The schematic diagram of the network architecture may be a network architecture in an LTE communications system, may be an architecture in a universal mobile telecommunications system (Universal Mobile Telecommunications System, UMTS) terrestrial radio access network (UMTS Terrestrial Radio Access Network, UTRAN) or an architecture in a global system for mobile communications (Global System for Mobile Communications, GSM)/enhanced data rates for GSM evolution (Enhanced Data Rates for GSM Evolution, EDGE) system radio access network (GSM EDGE Radio Access Network, GERAN), or may be an architecture in a 5th generation (5th Generation, 5G) mobile communications system. The schematic diagram of the network architecture includes a mobility management entity (Mobility Management Entity, MME)/serving gateway (Serving GateWay, SGW), a base station, and user equipment (User Equipment, UE). It should be noted that forms and quantities of MMEs/SGWs, base stations, and UEs shown in FIG. 2 are used as an example for description, and constitute no limitation on the embodiments of the present invention.

The MME is a key control node in 3rd generation partnership project (3rd Generation Partnership Project, 3GPP) LTE, is a core network element, and is mainly responsible for signaling processing, namely, control plane functions, including functions such as access control, mobility management, attachment and detachment, a session management function, and gateway selection. The SGW is an important network element of the core network element in 3GPP LTE, and is mainly responsible for a user plane function of forwarding user data, that is, routing and forwarding a data packet under control of the MME.

The base station is configured to communicate with the user equipment, and may be a base transceiver station (Base Transceiver Station, BTS) in a GSM system or a code division multiple access (Code Division Multiple Access, CDMA) system, a NodeB (NodeB, NB) in a WCDMA system, an evolved NodeB (evolved Node B, eNB) in an LTE system, or a gNB in a 5G system or a base station in a future communications system. The base station is mainly responsible for functions such as radio resource management on an air interface side, quality of service (Quality of Service, QoS) management, and data compression and encryption. For a core network side, the base station is mainly responsible for forwarding control plane signaling to the MME and forwarding user plane service data to the SGW.

The user equipment is a device that accesses a network side by using the base station, and may include but is not limited to a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device or a computing device with a wireless communication function, or another processing device connected to a wireless modem, a vehicle-mounted device, a wearable device, or a terminal device in a future 5G network.

An S1 interface shown in FIG. 2 is a standard interface between a base station and a core network. The base station is connected to the MME through an S1-MME interface, to control signaling transmission, and the base station is connected to the SGW through an S1-U interface, to perform user data transmission. The S1-MME interface and the S1-U interface are collectively referred to as S1 interfaces.

An X2 interface shown in FIG. 2 is a standard interface between base stations, and is used to implement interworking between the base stations.

A Uu interface shown in FIG. 2 is a standard interface between user equipment and a base station, and the user equipment accesses an LTE/5G network through the Uu interface.

Certainly, a wireless communications network (for example, an LTE network) shown in FIG. 2 is cell-centered. Base stations in different cells serve UE in the respective cells. When UE enters a neighboring cell from a current cell during movement, a cell handover occurs. However, a cell handover process is very complex, and signaling overheads in the process are relatively high. Consequently, a relatively high delay is caused, and negative impact may be imposed on user experience of the UE to some extent.

Figure 3:
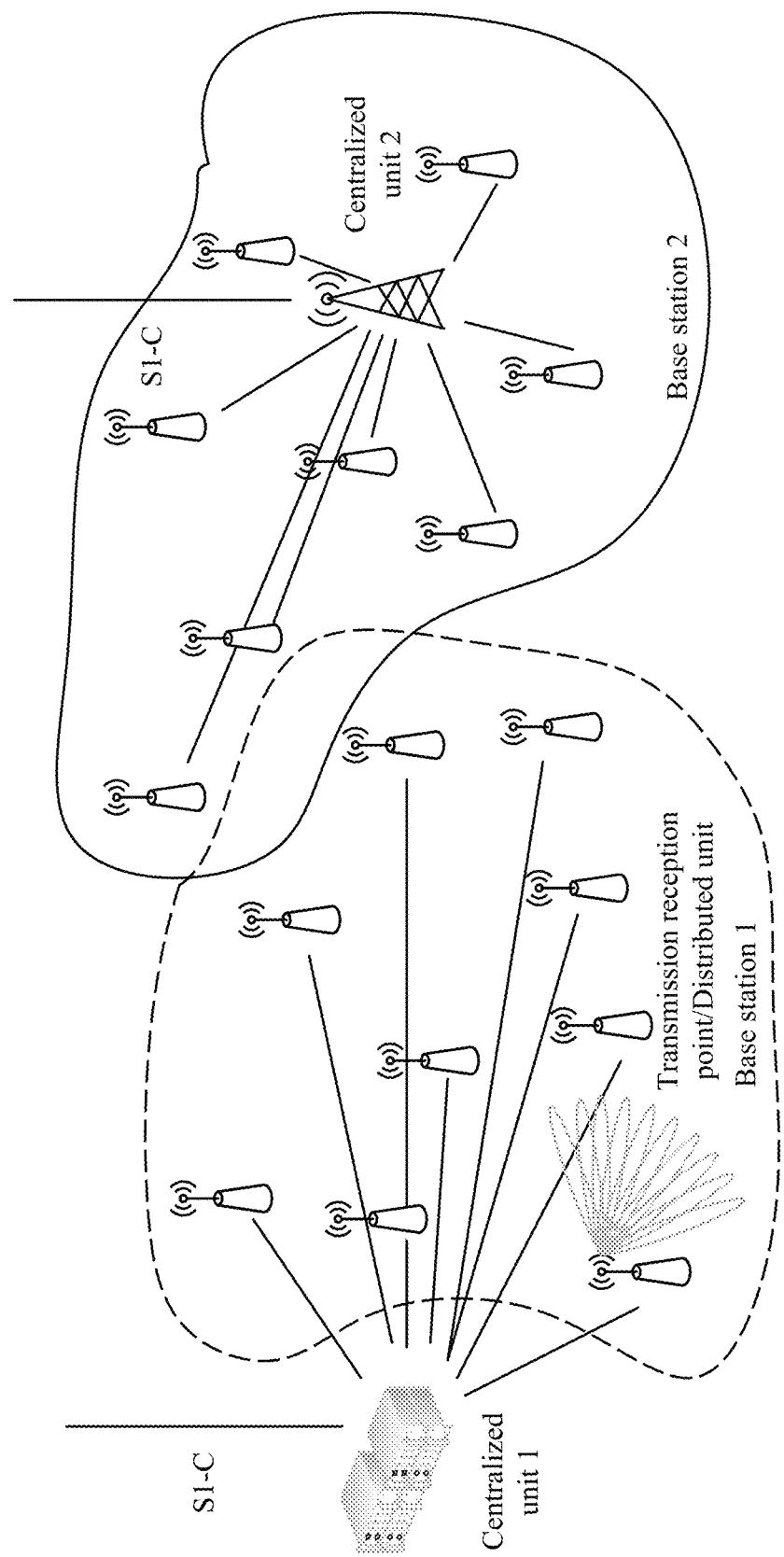
FIG. 3 is a schematic diagram of an example of another network architecture that may be applied to an embodiment of the present invention.

FIG. 3 is a schematic diagram of an example of another network architecture that may be applied to an embodiment of the present invention. The schematic diagram of the network architecture may be a network architectural diagram of new radio (New Radio, NR) in a next generation wireless communications system. In the schematic diagram of the network architecture, one base station is divided into one centralized unit (Centralized Unit, CU), and a plurality of transmission/reception points (Transmission/Reception Point, TRP)/distributed units (Distributed Unit, DU). In other words, a bandwidth-based unit (Bandwidth Based Unit, BBU) of the base station is reconfigured into function entities: the DU and the CU. It should be noted that forms and quantities of centralized units and TRPs/DUs shown in FIG. 3 are used as an example for description, and constitute no limitation on the embodiments of the present invention. Although forms of centralized units corresponding to a base station 1 and a base station 2 shown in FIG. 3 are different, functions of the base stations are not affected. It may be understood that a centralized unit 1 and a TRP/DU that is within a range indicated by a dashed line are constituent elements of the base station 1, and a centralized unit 2 and a TRP/DU that is within a range indicated by a solid line are constituent elements of the base station 2. The base station 1 and the base station 2 are base stations in an NR system.

The CU processes a function of an upper radio protocol stack layer, for example, a radio resource control (Radio Resource Control, RRC) layer or a packet data convergence protocol (Packet Data Convergence Protocol, PDCP) layer, and even can support transferring some core network functions down to an access network. A term is referred to as an edge computing network. The edge computing network can meet a higher network delay requirement of emerging services such as a video, online shopping, and virtual/augmented reality on a future communications network.

The DU mainly processes a physical layer function, and a layer 2 function with a relatively high real-time requirement. In view of transmission resources of a radio remote unit (Radio Remote Unit, RRU) and the DU, some physical layer functions of the DU may be transferred up to the RRU. As the RRU becomes smaller, the DU may be even combined with the RRU.

CUs may be deployed in a centralized manner. DUs are deployed based on an actual network environment. In a core urban area or an area with relatively high traffic intensity, a relatively short distance between stations, and limited equipment room resources, for example, a campus or a large-scale performance venue, DUs may also be deployed in a centralized manner. In an area with relatively low traffic intensity and a relatively long distance between stations, for example, a suburb or a mountainous area, DUs may be deployed in a distributed manner.

An S1-C interface used as an example in FIG. 3 may be a standard interface between a base station and a core network, and specific devices connected through the S1-C interface are not shown in FIG. 3.

In the embodiments of the present invention, a CSI-RS may be used as a measurement manner for UE in a downlink connected mode.

The following describes application of the CSI-RS in LTE.

A channel state information-reference signal CSI-RS is an important reference signal in an LTE network, and is mainly used by UE to obtain radio channel state information CSI. In the LTE network, the CSI-RS may be transmitted through a maximum of 32 antenna ports (antenna port), and corresponding antenna port numbers are p=15, 16, . . . , 42 As for the antenna port, a spatial dimension in LTE is measured in terms of "layer (layer)", and is implemented by using a multiple-antenna transmission technology and a multiple-antenna reception technology. Each layer corresponds to one effective data flow, and is mapped to a logical antenna port. Each antenna port corresponds to one time-frequency resource grid, and corresponds to one reference signal, so that a receive end performs channel estimation, coherent demodulation, and the like.

A sequence of the CSI-RS in frequency domain is defined as follows:

$$r_{l,n_s}(m) = \frac{1}{\sqrt{2}}(1-2\cdot c(2m)) + j\frac{1}{\sqrt{2}}(1-2\cdot c(2m+1)),$$

$$m = 0, 1, \ldots, N_{RB}^{max,DL} - 1,$$

where $n_s$ is a sequence number of a slot (slot) in a radio frame (radio frame), l is a sequence number of an orthogonal frequency division multiplexing (Orthogonal Frequency Division Multiplexing, OFDM) symbol in a slot, c(i) is a pseudo random sequence, and each OFDM symbol is initialized by using $c_{init}$. $c_{init}$ is defined as follows:

$$c_{init} = 2^{10}\cdot(7\cdot(n_s'+1)+l+1)\cdot(2\cdot N_{ID}^{CSI}+1)+2\cdot N_{ID}^{CSI}+N_{CP}.$$

Figure 4:
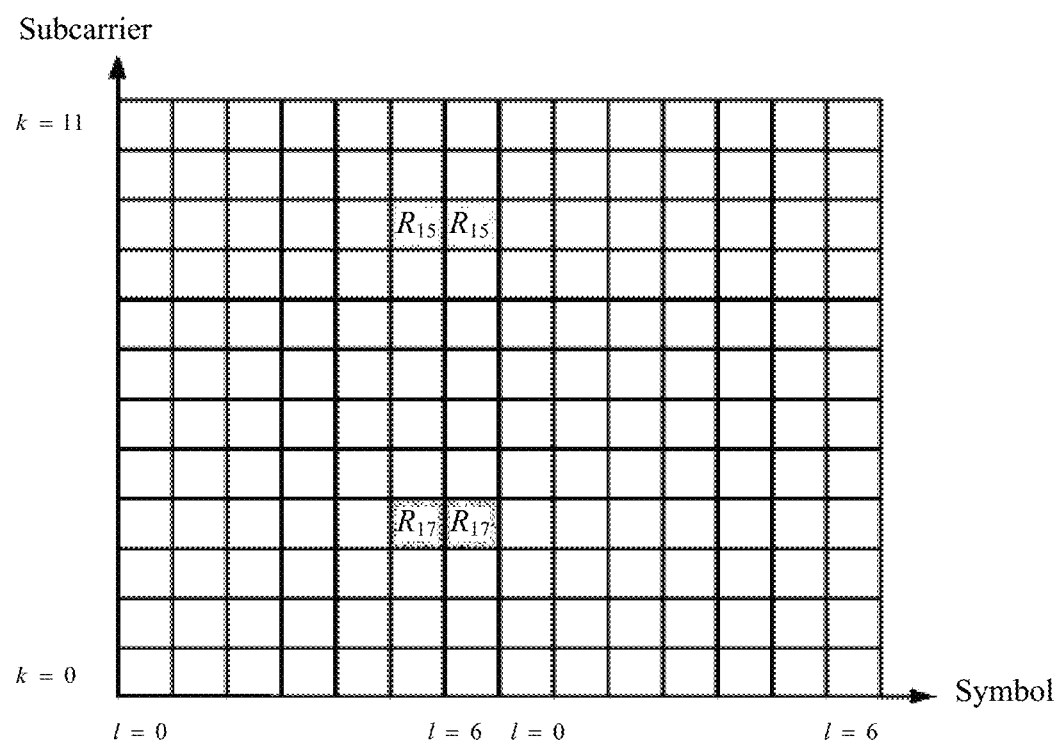
FIG. 4 is a schematic diagram of time-frequency resource mapping.

A relatively key parameter is $N_{ID}^{CSI}$ and $N_{ID}^{CSI}$ may be a cell identity or a virtual cell identity, and ranges from 0 to 503. A base station in LTE periodically sends a CSI-RS signal. A period may be 5 milliseconds, 10 milliseconds, 20 milliseconds, 40 milliseconds, or 80 milliseconds. In addition, CSI-RSs sent on different antenna ports may occupy different time-frequency resources. FIG. 4 is a schematic diagram of a mapping relationship of a CSI-RS in a physical resource block pair, where $R_{15}$ and $R_{17}$ respectively represent a CSI-RS signal on an antenna port 15 and a CSI-RS signal on an antenna port 17.

The foregoing description about the CSI-RS in LTE may be used as a supplement to the embodiments of the present invention. In the embodiments of the present invention, application of a CSI-RS further changes compared with that in LTE. In the embodiments of the present invention, the CSI-RS may be used as a measurement manner for UE in a downlink connected mode, but this cannot be implemented in an LTE communications system. To use a CSI-RS as a measurement manner for UE in a downlink connected mode, a network device needs to notify the user equipment of a CSI-RS configuration, especially time resource information, so that the user equipment performs CSI-RS measurement and reporting. The embodiments of the present invention provide a reference signal notification method and apparatus, and in particular, a CSI-RS notification method and apparatus, to effectively improve mobility measurement efficiency.

The method and apparatus provided in the embodiments of the present invention may be applied to the schematic diagram of the network architecture shown in FIG. 2 or FIG. 3. The network device in the embodiments of the present invention may be the base station shown in FIG. 2, may be the TRP/DU shown in FIG. 3, or may be a combination of a TRP/DU and a CU. The user equipment in the embodiments of the present invention may include but is not limited to a cellular phone, a cordless phone, a handheld device or a computing device with a wireless communication function, or another processing device connected to a wireless modem, a vehicle-mounted device, a wearable device, or a terminal device in a future 5G network. In addition, although a plurality of network elements are included in the embodiments of the present invention, it does not indicate that all the network elements should be included in the protection solutions of this application.

Figure 5:
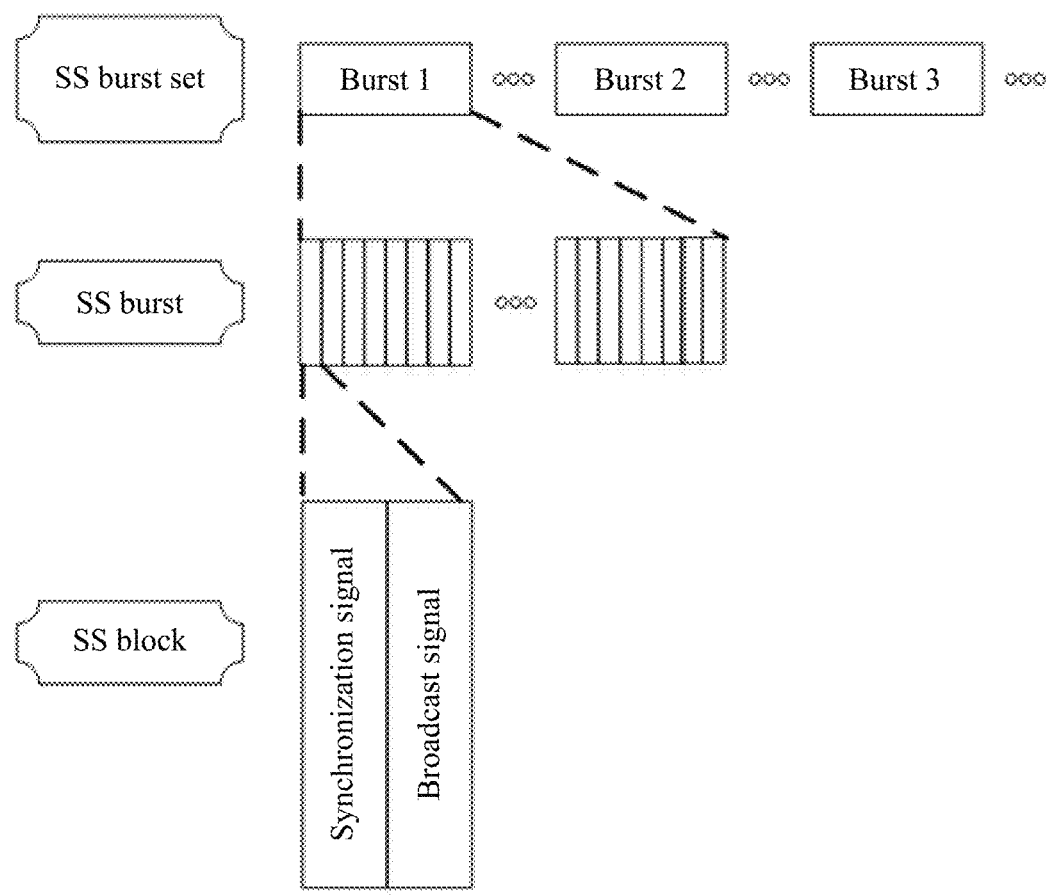
FIG. 5 is a schematic diagram of an example of a time-frequency resource configuration of a synchronization signal block.

The following briefly describes a synchronization signal block (Synchronization Signal block, SS block) and describes an SS block timing index. FIG. 5 is a schematic diagram of an example of a time-frequency resource configuration of an SS block. It can be learned from the example in FIG. 5 that the SS block includes a PSS, an SSS, and a PBCH. The PSS and the SSS each may occupy one OFDM symbol, and the PBCH may occupy two or more OFDM symbols. A plurality of SS blocks may constitute one subframe. It may be understood that one SS block may correspond to one beam of a network device, and measuring a beam is actually measuring a measurement signal in the SS block corresponding to the beam. It may also be understood that a plurality of SS blocks correspond to one beam of a network device, and measuring a beam is actually measuring a measurement signal in the plurality of SS blocks corresponding to the beam.

FIG. 5 is a schematic diagram of an example of resource structures of a synchronization channel and a broadcast channel. A synchronization signal and a broadcast signal constitute one SS block (English: SS block), one or more SS blocks constitute one SS burst (English: SS burst), and one or more SS bursts constitute one SS burst set (English: SS burst set). In a transmission period, for example, in a period of an SS burst set, there may be a plurality of SS blocks, and a terminal device cannot determine a location of a detected SS block in the plurality of SS blocks only through detection of a synchronization signal. Therefore, each SS block has a time index (English: time index). The time index indicates a location of the SS block in a plurality of SS blocks, or may be understood as indicating a ranking of the SS block in a plurality of SS blocks. The time index of each SS block may be carried in a PBCH of the SS block. The UE obtains information about the SS block time index in the PBCH, to obtain time synchronization information of the cell. The time synchronization information includes information about frame synchronization/slot synchronization/symbol synchronization. In this case, time synchronization cannot be implemented and a radio frame structure cannot be determined.

The following describes in detail the reference signal notification method provided in the embodiments of the present invention.

Figure 9:
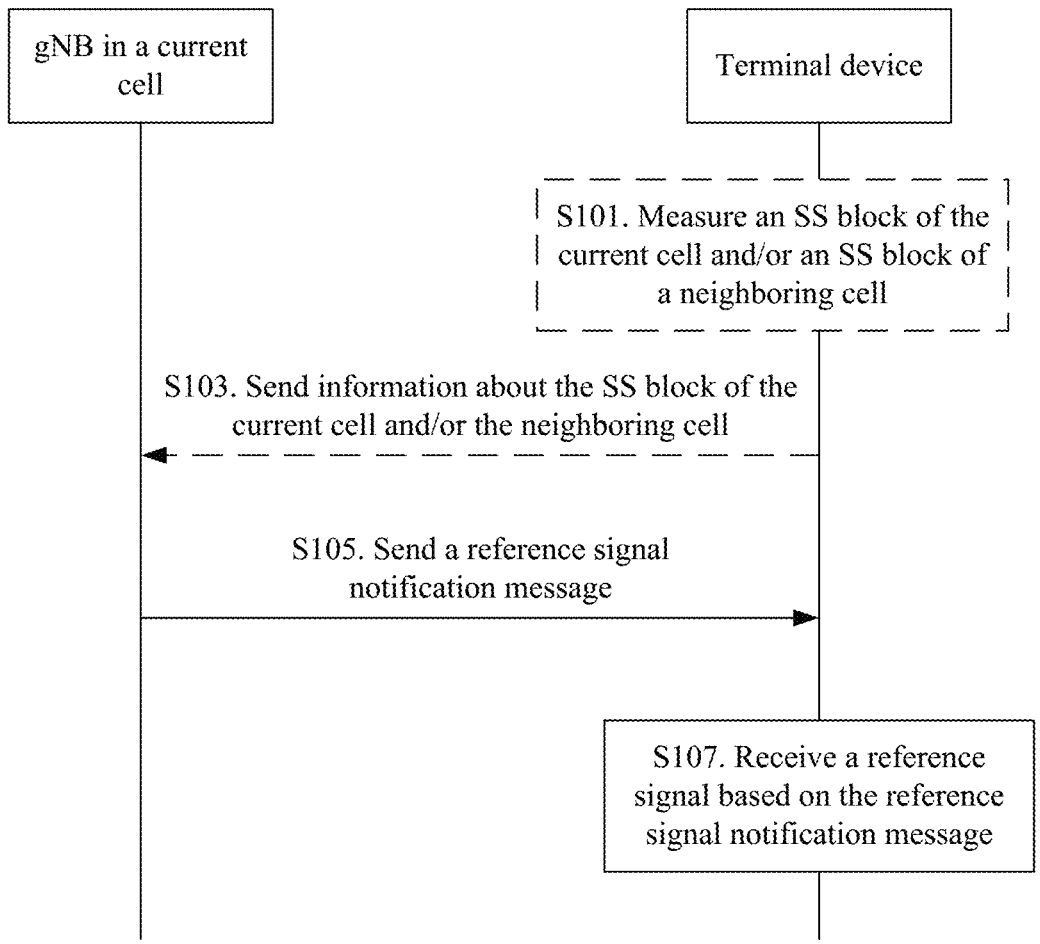
FIG. 9 is a schematic diagram of a reference signal notification method according to an embodiment of the present invention.

FIG. 9 is a schematic flowchart of a reference signal notification method according to an embodiment of the present invention. The method is described from a perspective of interaction between a network device and user equipment (UE for short). However, in the protection scope of this embodiment of the present invention, there is no limitation that both of the network device and the UE are required, and only the network device or only the UE may be included. The method includes but is not limited to the following processing.

S101. The UE measures an SS block of a current cell and/or an SS block of a neighboring cell, where this process is optional.

S103. The UE sends information about the SS block of the current cell and/or the neighboring cell, where this process is optional. Optionally, the information is sent to a network device. Further optionally, the information is sent to a network device in the current cell. For ease of description, the network device is represented by a gNB, but is not limited to the gNB in implementation. Optionally, the gNB receives the information that is about the SS block of the current cell and/or the neighboring cell and that is fed back by the UE.

S105. A gNB sends a reference signal notification message, and optionally, a gNB in the current cell sends a reference signal notification message. Optionally, the gNB sends the notification message to the UE. Further optionally, the UE receives the reference signal notification message.

A cell to which a serving base station belongs may be referred to as the current cell. The gNB may be a source base station in a handover process. The gNB has one or more neighboring cells. The UE may be handed over from the source base station to a target base station. The target base station may be a base station in the one or more neighboring cells of the source base station. Each term in this embodiment of this application is merely an example. A person skilled in the art may know that another name may be used.

A reference signal may be a CSI-RS, and further may be a CSI-RS of the neighboring cell, may be a CSI-RS of the neighboring cell, may be a CSI-RS corresponding to a cell ID of the neighboring cell, or the like.

The notification message includes time resource information of a reference signal. The time resource information may be but not limited to the following information:

1. The CSI-RS may be a CSI-RS of the neighboring cell, and the time resource information may be time resource information of the CSI-RS. Further, the time resource information may be subframe configuration information of the CSI-RS, and further the time resource information may be subframe configuration information of the CSI-RS of the neighboring cell. The subframe configuration information may be subframe configuration index information. Different subframe configuration index information indicates different subframe configurations. The following provides an example of the subframe configuration index information in a table methods. In this embodiment of this application, the table form is used as an example, and this is not limited to the table form in actual implementation. Another form such as a formula may be alternatively used, and details are not described below. For ease of description, an example of the subframe configuration information is denoted as CSI-RS-subframeconfig. For example, a configuration manner in Table 1 is as follows:

TABLE 1

| CSI-RS-subframeconfig I_csi-rs | CSI-RS periodicity T_csi-rs (subframes) | CSI-RS subframe offset delta_csi-rs (subframes) |
| --- | --- | --- |
| 0-4 | 5 | I_csi-rs |
| 5-14 | 10 | I_csi-rs-5 |
| 15-34 | 20 | I_csi-rs-15 |
| 35-74 | 40 | I_csi-rs-35 |
| 75-154 | 80 | I_csi-rs-75 |

The example of CSI-RS-subframeconfig corresponds to subframe configuration indexes with values 0 to 154, as shown in the first column. Each value corresponds to one CSI-RS period value, as shown in the second column, and corresponds to an offset of the CSI-RS in the period, as shown in the third column. A subframe of the CSI-RS needs to meet the following condition: $(10n_f + \lfloor n_s/2 \rfloor - \Delta_{CSI-RS}) \mod T_{CSI-RS} = 0$, where $n_f$ is a system frame number, the system frame number may be obtained by using system information, and the system frame number may range from 0 to 1023, and $n_s$ is a number of a slot in a system frame, and the slot number may be denoted as a slot number, and may range from 0 to 19.

The subframe configuration information of the CSI-RS may be indicated based on a cell ID. Optionally, the subframe configuration index information of the CSI-RS may be indicated based on a cell ID. In this way, subframes of CSI-RSs of different cells are staggered in time. For each cell, a cell ID mod 504 operation is performed based on the cell ID and 504, and an obtained result corresponds to a CSI-RS-subframeconfig value, and therefore a subframe, for sending a CSI-RS, corresponding to the cell is obtained. For all UEs in the cell, subframe configurations of the CSI-RS may be the same. An example is shown in Table 2. In this case, the time resource information of the CSI-RS of the neighboring cell, for example, the subframe configuration information of CSI of the neighboring cell can be indicated provided that the gNB adds information about a cell ID of the neighboring cell to the notification message. This indication manner is an implicit indication manner in which signaling overheads can be reduced.

TABLE 2

| Cell ID mod 504 | CSI-RS-subframeconfig I_csi-rs | CSI-RS periodicity T_csi-rs (subframes) | CSI-RS subframe offset delta_csi-rs (subframes) |
|---|---|---|---|
| 0-4 | 0-4 | 5 | I_csi-rs |
| 5-14 | 5-14 | 10 | I_csi-rs-5 |
| 15-34 | 15-34 | 20 | I_csi-rs-15 |
| 35-74 | 35-74 | 40 | I_csi-rs-35 |
| 75-154 | 75-154 | 80 | I_csi-rs-75 |

Figure 6:
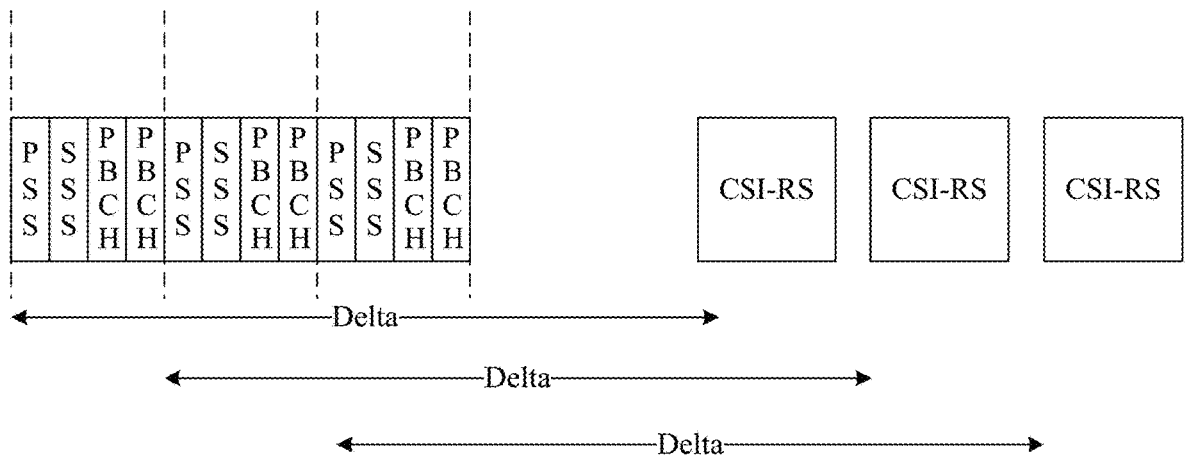
FIG. 6, FIG. 7, and FIG. 8 are schematic diagrams of time resource information according to an embodiment of the present invention.
Figure 8:
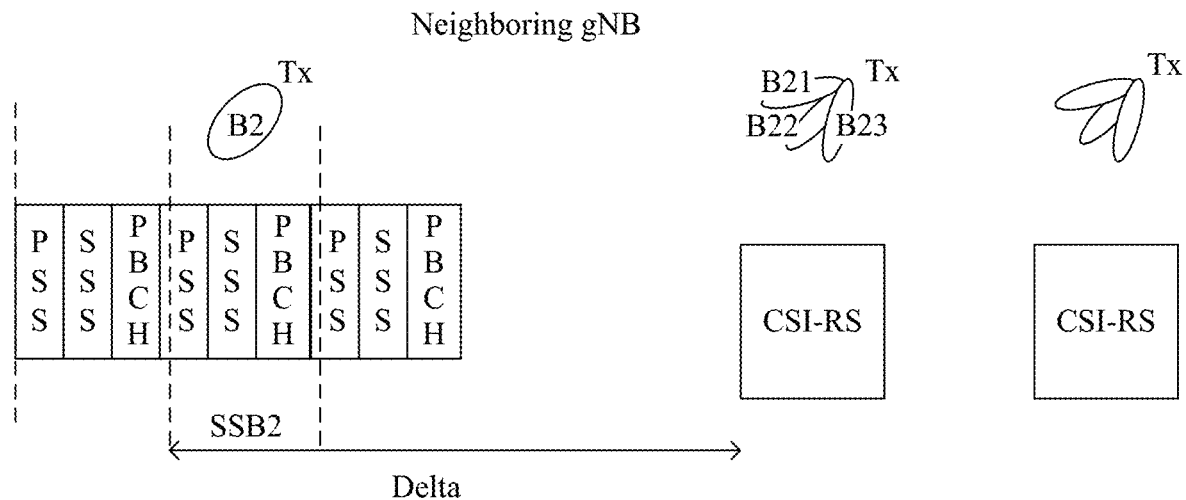

2. The CSI-RS may be a CSI-RS of the neighboring cell of the gNB, and the time resource information may be a time offset. For example, the time offset may have the following two forms:

(a) The time resource information may be a time offset corresponding to a subframe of the CSI-RS. Further, the time resource information may be a time offset corresponding to a subframe of the CSI-RS of the neighboring cell, and the time offset may be an offset based on an SS block. The SS block may be an SS block of the neighboring cell, or may be an SS block of the current cell. The SS block may be one or more SS blocks fed back by the UE. Further, The SS block may be an optimal SS block in one or more SS blocks fed back by the UE. For example, the time offset may be represented as a delta shown in FIG. 6 or FIG. 8. Each SS block corresponds to one CSI-RS after a time offset of the SS block. Therefore, after reading an SS block, the UE obtains a time location of a CSI-RS with reference to the time offset delta, and the UE performs CSI-RS measurement at the location of the CSI-RS. In FIG. 8, B2 may be an SS block fed back by the UE. FIG. 6 is merely an example. The three SS blocks may be SS blocks fed back by the UE, or may represent any SS block. Although there are three consecutive SS blocks in FIG. 6, this constitutes no limitation. There may be an SS block in another form, or there may be only one SS block.

(b) The time resource information may be a time boundary of the current cell. A granularity of the time boundary may be a frame boundary, a subframe boundary, a slot boundary, or a symbol boundary, or may be a boundary of an SS block of the current cell. The granularity may be the foregoing various granularities. For example, The boundary of the SS block may be the first symbol, the last symbol, the first subframe, the last subframe, or the like of the SS block. The time offset may be at a symbol level, for example, 10 symbols, or may be at a slot level or a subframe level, for example, two subframes.

Figure 7:
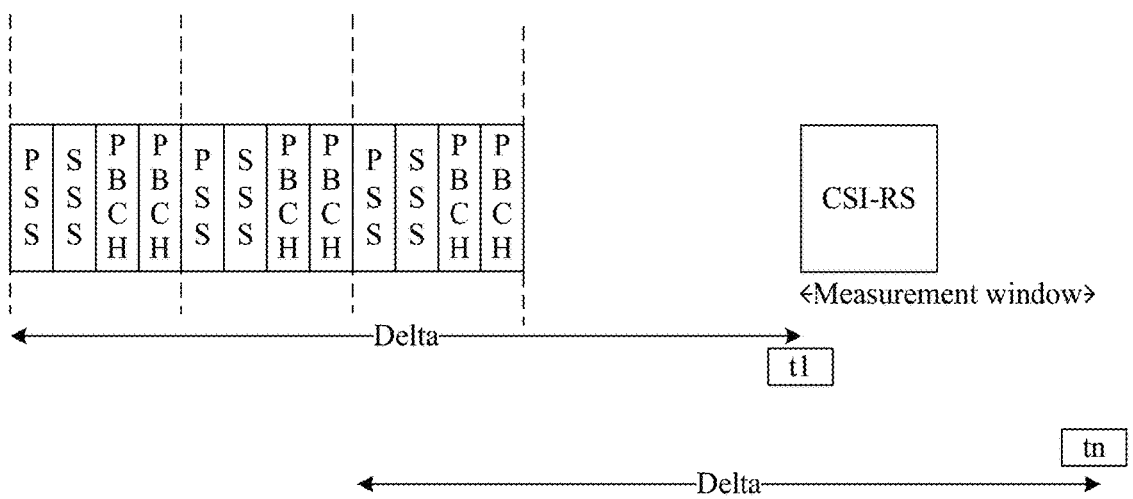

3. The time resource information may be measurement window information. The UE may perform CSI-RS measurement at a possible CSI-RS location in a corresponding measurement window. For example, as shown in FIG. 7, after reading an SS block, the UE obtains a possible time location t1 of the CSI-RS based on information that the SS block is the first SS block and with reference to a time offset delta, and obtains a possible time location tn of the CSI-RS based on an $n^{th}$ SS block after the SS block and with reference to the time offset delta. In this case, the UE performs CSI-RS measurement in a period from t1 to tn, where n may be a positive integer greater than 1.

Optionally, the notification message includes beam information of the reference signal. If no beam information of the reference signal is carried in the notification message, the CSI-RS of the neighboring cell may be sent in all beam sending directions of a downlink CSI-RS, in other words, a manner of performing scanning in all possible beam directions may be used. If the beam information of the reference signal is carried in the notification message, the CSI-RS of the neighboring cell may be sent in a beam direction indicated in the notified beam information. The beam information may be information about an SS block, and further may be information about an SS block of the neighboring cell, for example, a time index of the SS block of the neighboring cell. The beam information may be information about one or more SS blocks fed back by the UE, may be information about all or some of one or more SS blocks fed back by the UE, or may be understood as information about one or more SS blocks in one or more SS blocks fed back by the UE.

A process in which the UE feeds back information about one or more SS blocks of the neighboring cell may be as follows:

1. The UE measures an SS block of the neighboring cell to obtain time synchronization information of the neighboring cell. The time synchronization information of the neighboring cell may include symbol synchronization, frame synchronization, slot synchronization, or the like.

2. The UE feeds back, to the gNB in the current cell, the information about the one or more SS blocks of the neighboring cell that are measured by the UE. The information about the SS block may include a time index of the SS block, and optionally, further includes SS block RSRP information corresponding to the SS block. The information about the one or more SS blocks that is fed back may be but not limited to information about all SS blocks measured by the UE, information about some of SS blocks measured by the UE, or information about one or more optimal SS blocks obtained through measurement.

3. The gNB receives the information about the one or more SS blocks that is fed back by the UE, and obtains beam information of the CSI-RS of the neighboring cell based on the information about the one or more SS blocks that is fed back by the UE. The information about the SS block that is fed back by the UE is usually about an SS block with better received signal quality. Therefore, for a beam direction in which the CSI-RS is sent, refer to a beam direction of the SS block that is fed back.

The beam information of the reference signal may be information about one or more SS blocks in one or more SS blocks fed back by the UE.

In an implementation process, the beam information of the reference signal may be notified in a plurality of implementations.

In an example of Table 3, in addition to subframe configuration information of the CSI-RS in the first column, the reference message notification message further includes SS block information and an SS block time index. For example, Ti_1, . . . , and Ti_10 are SS block time indexes with a value range of [0, 63], and there may be different configurations. Certainly, there may be a correspondence such as a one-to-many correspondence, a many-to-one correspondence, or a many-to-many correspondence between subframe configuration information of a CSI-RS and SS block information, and the correspondence may be represented by using a table, a formula, a function, or the like.

TABLE 3

| CSI-RS-subframeconfig I_csi-rs | CSI-RS periodicity T_csi-rs (subframes) | CSI-RS subframe offset delta_csi-rs (subframes) | Associated SS block time index |
|---|---|---|---|
| 0-4 | 5 | I_csi-rs | Ti_1 and Ti_2 |
| 5-14 | 10 | I_csi-rs-5 | Ti_3 and Ti_4 |

TABLE 3-continued

| CSI-RS-subframeconfig I_csi-rs | CSI-RS periodicity T_csi-rs (subframes) | CSI-RS subframe offset delta_csi-rs (subframes) | Associated SS block time index |
|---|---|---|---|
| 15-34 | 20 | I_csi-rs-15 | Ti_5 and Ti_6 |
| 35-74 | 40 | I_csi-rs-35 | Ti_7 and Ti_8 |
| 75-154 | 80 | I_csi-rs-75 | Ti_9 and Ti_10 |

Optionally, the reference signal notification message may optionally include one or more pieces of the following information, and for the gNB or the UE in the current cell, the information is all about the neighboring cell:

A. A cell identity, for example, a cell ID. For details, refer to the description of Table 2. A cell corresponding to the CSI-RS may be identified by carrying the cell ID.

B. Period information corresponding to a subframe of the CSI-RS. If the reference information notification message carries the period information, it indicates that the CSI-RS is configured periodically. If the reference information notification message does not carry the period information, it indicates that the CSI-RS is aperiodically configured, and each SS block needs to be read first, and then a corresponding CSI-RS is obtained.

C. Bandwidth information of the CSI-RS. The bandwidth may be a system bandwidth, or may be a partial bandwidth of a system bandwidth. The bandwidth information is carried, so that measurement can be performed more flexibly. The system bandwidth can provide higher measurement precision, and the partial bandwidth may adapt to UEs with different capabilities. For example, some UEs can perform measurement only on the partial bandwidth or it is more suitable for some UEs to perform measurement on the partial bandwidth.

D. Antenna port information of the CSI-RS. The antenna port information of the CSI-RS may be delivered in RRC signaling. The antenna port may be, for example, one or more of values such as {1, 2, 4, 8, 16}. Certainly, a port set is not limited to {1, 2, 4, 8, 16}, and may be another combination. Different quantities of antenna ports are indicated, so that the UE can measure different quantities of neighboring cells, thereby implementing higher measurement flexibility.

The antenna port information of the CSI-RS may be further associated with the foregoing beam information, and an example is shown in Table 4:

TABLE 4

| SS block time index 1 | CSI-RS ports 15 and 16; CSI-RS ports 17 and 18; CSI-RS ports 19 and 20; |
| SS block time index 2 | CSI-RS ports 21 and 22 |
| SS block time index 3 | CSI-RS ports 23 and 24; CSI-RS ports 25 and 26; |

A beam sending direction of an SS block corresponding to the SS block time index 1 corresponds to beam directions of CSI-RSs sent through ports 15 and 16, ports 17 and 18, and ports 19 and 20. For example, as shown in FIG. 8, a beam B2 corresponding to an SSB 2 may correspond to three beams B21 to B23 of a CSI-RS. A beam sending direction of an SS block corresponding to the SS block time index 3 corresponds to beam directions of CSI-RSs sent through ports 23 and 24, and ports 25 and 26.

E. Numerology information of the CSI-RS. The numerology may be consistent with a numerology of a synchronization signal, or may be consistent with a numerology of data. In terms of form, a numerology index may be notified. For example, the numerology may be different values of subcarrier spacings {15, 30, 60, 120, 240 kHz}. In this case, the numerology index may be represented by three bits, and different values of the numerology index represent different numerologies. A CSI-RS can be more flexible by using a numerology carrying the CSI-RS. For example, a subcarrier spacing of the CSI-RS is configured to be different from a subcarrier spacing of data. This helps the UE to configure more CSI-RS resources in a slot, and helps a plurality of UEs to use a same subcarrier spacing that is different from a subcarrier spacing of a data part, so that measurement is more comparable.

F. Time-frequency resource mapping relationship information of the CSI-RS, namely, a time-frequency resource location of an RE.

Optionally, the gNB may send the reference signal notification message by using RRC signaling or a broadcast message. The RRC signaling may be specific to a user.

Optionally, the gNB may send the reference signal notification message in, without limitation to, the following one or more conditions:

i. The gNB detects that the UE is at a boundary of the current cell.

ii. The gNB detects that SS block RSRP, measured by the UE, of the current cell is relatively low, for example, is lower than a threshold.

iii. The gNB detects that SS block RSRP, fed back by the UE, of the neighboring cell is relatively high, for example, exceeds a threshold.

S107. The UE receives a reference signal based on the reference signal notification message. For example, the UE may determine, based on an SS block time index, a direction for receiving a CSI-RS. The UE reads an SS block, obtains, based on a timing offset, configuration information including CSI-RS timing, determines a location of the CSI-RS, and performs CSI-RS measurement and feedback. Alternatively, it may be understood as that the UE reads a PBCH broadcast message of the neighboring cell, to obtain configuration information of the CSI-RS of the cell, and receives a reference signal, namely, the CSI-RS, based on the configuration information of the CSI-RS.

Figure 10:
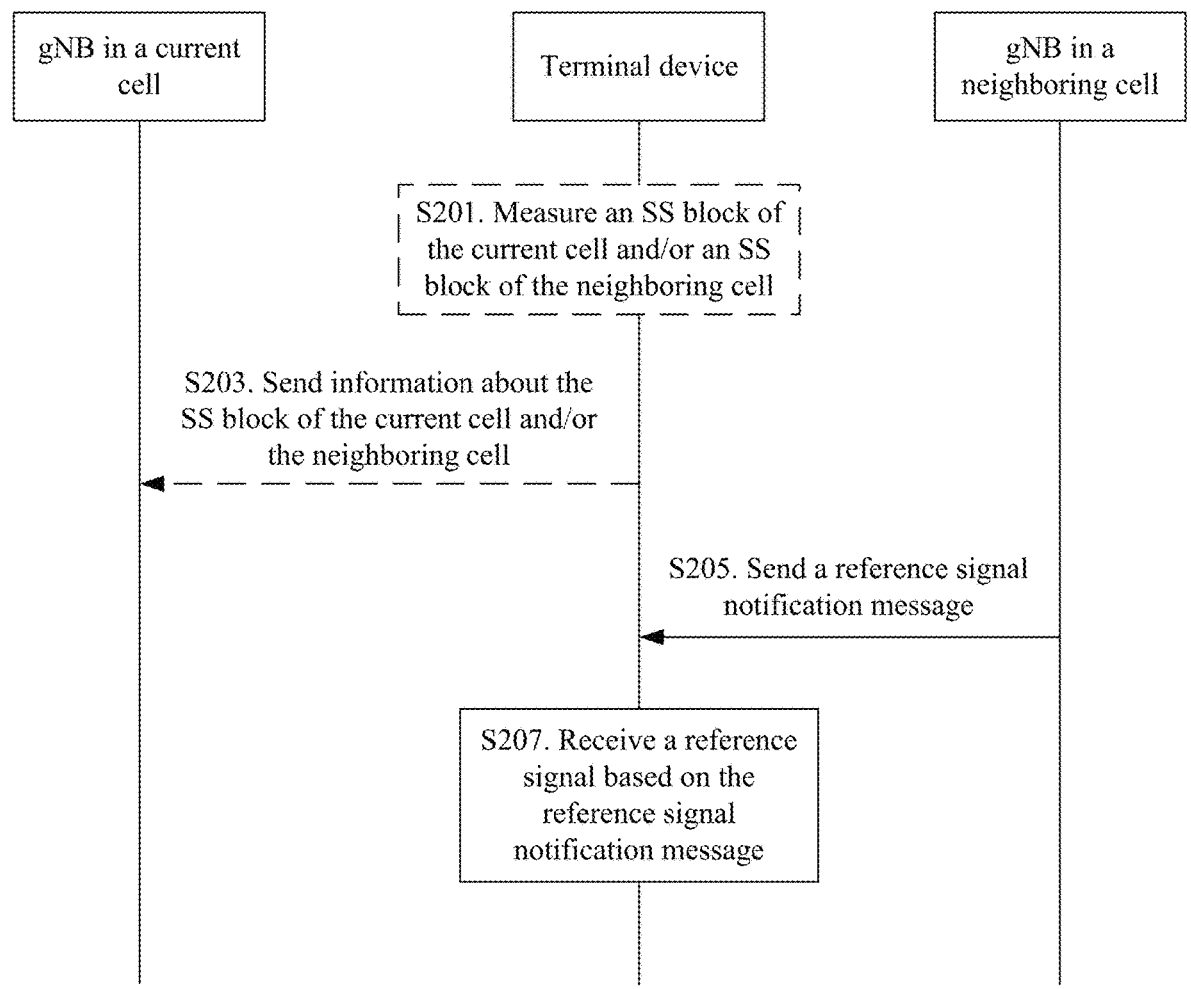
FIG. 10 is a schematic diagram of another reference signal notification method according to an embodiment of the present invention.

FIG. 10 is a schematic flowchart of another reference signal notification method according to an embodiment of the present invention. A gNB in a neighboring cell sends a reference signal notification message to UE.

For S201 and S203, refer to the description in the embodiment in FIG. 9.

In this embodiment, in S205, a gNB sends a reference signal notification message. Optionally, the gNB in the neighboring cell provides a notification about the reference signal notification message. For information included in the reference signal notification message, refer to the description in the embodiment in FIG. 9. A difference between the information described in FIG. 9 and that described in FIG. 10 is that in FIG. 9, the gNB in the current cell provides a notification to the UE, and therefore for the gNB in the current cell or the UE, a large amount of information is information about the neighboring cell, but in this embodiment, the gNB in the neighboring cell provides a notification to the UE, and therefore for the gNB in the neighboring cell, a large amount of information may be information about the current cell, and certainly, may be information about the neighboring cell for the UE. For example, if no cell handover is performed, and a serving cell remains a source cell other than a target cell, the information may be information about the neighboring cell.

For S207, refer to the description in the embodiment in FIG. 9.

It can be learned from the foregoing description of the method in the embodiments of the present invention that according to the method or apparatus in the embodiments of the present invention, a reference signal configuration message, especially information about a CSI-RS, is notified to the UE, so that the network device can flexibly provide a reference signal, especially a CSI-RS, and the UE can more effectively receive the reference signal, especially the CSI-RS. Therefore, overheads of the reference signal, especially overheads of the CSI-RS can be effectively reduced.

The foregoing describes the method embodiments of the present invention in detail. The following describes an apparatus in an embodiment of the present invention.

Figure 11:
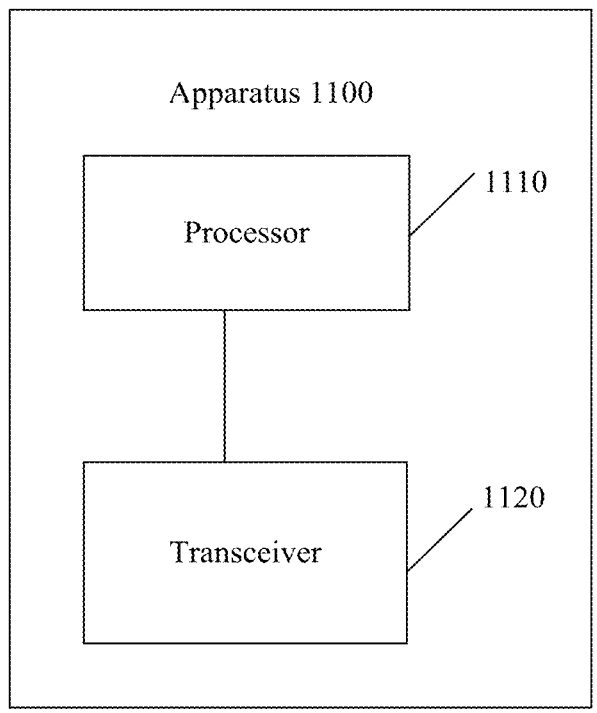
FIG. 11 is a schematic structural diagram of an apparatus according to an embodiment of the present invention.

FIG. 11 is a schematic block diagram of a reference signal notification apparatus 1100 according to an embodiment of the present invention. The apparatus 1100 may be a network device.

It should be understood that the apparatus 1100 may correspond to the network device in the method embodiments, and may have any function of the network device in the method.

As shown in FIG. 11, the apparatus 1100 includes a transceiver 1120, and optionally, further includes a processor 1110.

The transceiver is configured to send a reference signal notification message, where the reference signal notification message includes time resource information of a reference signal.

Optionally, the reference signal is a CSI-RS, and the time resource information is at least one of subframe configuration information, a time offset, and measurement window information of the CSI-RS.

Optionally, the reference signal is the CSI-RS, and the reference signal notification message further includes one or more pieces of the following information:

beam information of the CSI-RS, a cell identity, period information corresponding to a subframe of the CSI-RS, bandwidth information of the CSI-RS, antenna port information of the CSI-RS, numerology information of the CSI-RS, and time-frequency resource mapping relationship information of the CSI-RS.

Optionally, the time resource information and/or the beam information are/is information about one or more SS blocks fed back by a terminal device.

Optionally, the transceiver may be configured to receive information that is about an SS block of a current cell and/or a neighboring cell and that is fed back by the UE.

Optionally, the processor may be configured to: determine content included in the reference signal notification message, and/or generate the reference signal notification message. Further, the processor determines, based on the information that is about the SS block of the current cell and/or the neighboring cell and that is fed back by the UE, the content included in the reference signal notification message, and/or generates the reference signal notification message. For a specific determining method and generation method, refer to the foregoing method embodiments.

Figure 12:
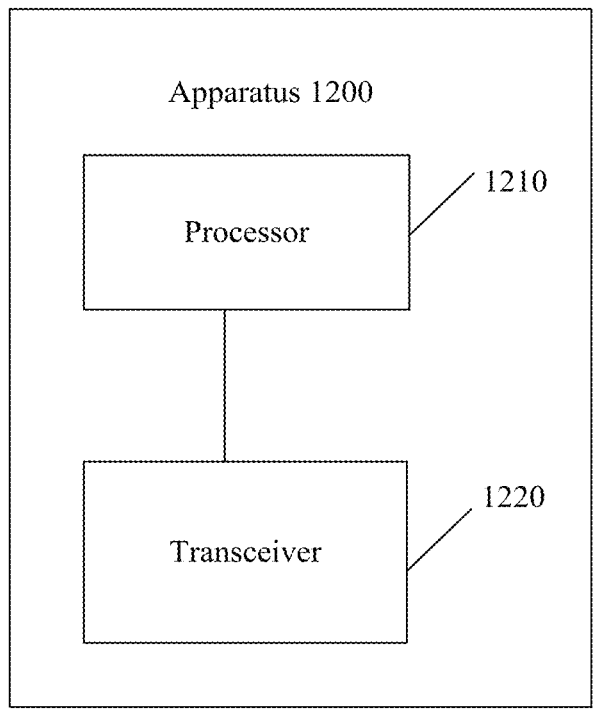
FIG. 12 is a schematic structural diagram of an apparatus according to an embodiment of the present invention.

FIG. 12 is a schematic block diagram of a reference signal notification apparatus 1200 according to another embodiment of the present invention. The apparatus 1200 may be a terminal device.

It should be understood that the apparatus 1200 may correspond to the terminal device in the method embodiments, and may have any function of the terminal device in the method.

As shown in FIG. 12, the apparatus 1200 includes a transceiver 1220, and optionally, further includes a processor 1210.

In an embodiment, the transceiver 1220 is configured to receive a reference signal, where the reference signal is sent on a specific time-frequency resource, and the specific time-frequency resource is on a symbol corresponding to a synchronization signal block. Optionally, the reference signal is a CSI-RS, and a time resource information is at least one of subframe configuration information, a time offset, and measurement window information of the CSI-RS.

Optionally, the reference signal is the CSI-RS, and a reference signal notification message further includes one or more pieces of the following information:

beam information of the CSI-RS, a cell identity, period information corresponding to a subframe of the CSI-RS, bandwidth information of the CSI-RS, antenna port information of the CSI-RS, numerology information of the CSI-RS, and time-frequency resource mapping relationship information of the CSI-RS.

Optionally, the time resource information and/or the beam information are/is information about one or more SS blocks fed back by the terminal device.

Optionally, the processor 1210 is further configured to measure an SS block of a current cell and/or an SS block of a neighboring cell.

Optionally, the transceiver 1220 is further configured to send information about the SS block of the current cell and/or the neighboring cell.

Optionally, the transceiver 1220 is configured to receive the reference signal based on the reference signal notification message.

For specific functions of the processor 1210 and the transceiver 1220, refer to the foregoing method embodiments. Details are not described again.

It should be understood that the processor 1110 or the processor 1210 in the embodiments of the present invention may be implemented by using a processing unit or a chip. Optionally, in an implementation process, the processing unit may include a plurality of units, for example, a mapping unit, and/or a signal generation unit, and/or a channel estimation unit.

It should be understood that the transceiver 1120 or the transceiver 1220 in the embodiments of the present invention may be implemented by using a transceiver unit or a chip. Optionally, the transceiver 1120 or the transceiver 1220 may include a transmitter or a receiver, or include a transmission unit or a receiving unit.

It should be understood that the processor 1110 and the transceiver 1120 in the embodiments of the present invention may be implemented by using a chip, and the processor 1210 and the transceiver 1220 may be implemented by using a chip.

Optionally, the network device or the terminal device may further include a memory. The memory may store program code, and the processor invokes the program code stored in the memory, to implement a corresponding function of the network device or the terminal device. Optionally, the processor and the memory may be implemented by using a chip.

An embodiment of the present invention further provides a processing apparatus, including a processor and an interface.

The processor is configured to perform the method in the embodiments of the present invention.

The processing apparatus may be a chip. The processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in a memory. The memory may be integrated into the processor, or may be located outside the processor and exist independently.

For example, the processing apparatus may be a field programmable gate array (Field Programmable Gate Array, FPGA), an application-specific integrated circuit (Application Specific Integrated Circuit, ASIC), a system on chip (System on Chip, SoC), a central processor unit (Central Processor Unit, CPU), a network processor (Network Processor, NP), a digital signal processing circuit (Digital Signal Processor, DSP), a micro controller unit (Micro Controller Unit, MCU), a programmable logic device (Programmable Logic Device, PLD), or another integrated chip.

An embodiment of the present invention further provides a communications system, including the network device in the foregoing network device embodiment and the terminal device in the foregoing terminal device embodiment.

To describe the solutions more clearly, description is added based on an application No. 201710314205.0 entitled "REFERENCE SIGNAL NOTIFICATION METHOD AND APPARATUS", without increasing or changing the solutions:

In the description in the foregoing embodiment, the description that "FIG. 9 is a schematic flowchart of a reference signal notification method according to an embodiment of the present invention. The method is described from a perspective of interaction between a network device and user equipment (UE for short). However, in the protection scope of this embodiment of the present invention, there is no limitation that both of the network device and the UE are required, and only the network device or only the UE may be included. The method includes but is not limited to the following processing" may be described more clearly as follows: "FIG. 9 is a schematic flowchart of a reference signal notification method according to an embodiment of the present invention. The method is described from a perspective of interaction between a network device and user equipment or a terminal device (where the user equipment or the terminal device may be referred to as UE). However, in the protection scope of this embodiment of the present invention, there is no limitation that both of the network device and the UE are required, and only the network device or only the UE may be included. The method includes but is not limited to the following processing".

In the description in the foregoing embodiment, a clerical error occurs in the description that "In an embodiment, the transceiver 1220 is configured to receive a reference signal, where the reference signal is sent on a specific time-frequency resource, and the specific time-frequency resource is on a symbol corresponding to a synchronization signal block". Based on other parts of this application, for clearer description, this sentence may be described as follows: "In an embodiment, the transceiver 1220 is configured to receive a reference signal notification message, where the reference signal notification message includes time resource information of a reference signal".

Based on the foregoing embodiments, added description is provided as follows: Three s of examples of the time resource information are provided in the foregoing embodiments. Herein, the time resource information is further described.

For the first type of time resource information:

Added description is provided as follows:

In the foregoing embodiment, there is the description that "The time resource information may be time resource information of the CSI-RS. Further, the time resource information may be subframe configuration information of the CSI-RS, and further the time resource information may be subframe configuration information of the CSI-RS of the neighboring cell". Further, the time resource information may be based on the neighboring cell or may be based on the current cell. Table 1 and Table 2 are still used as examples, and this is not limited to a table form. The subframe configuration information in Table 1 and Table 2 may be based on time of the neighboring cell or may be based on time of the current cell.

Therefore, the reference signal notification message may further include reference information used to indicate a reference of the time resource information. For example, the reference information is used to indicate whether the time resource information is based on the current cell or the neighboring cell. For example, one bit is used. When a value is 0, it indicates that the time resource information is based on the current cell; or when a value is 1, it indicates that the time resource information is based on the neighboring cell.

For the second type of time resource information:

(a) Added description is provided as follows:

The reference signal notification message may further include reference information used to indicate a reference of the time resource information. For example, the reference information is used to indicate whether the time resource information is based on the current cell or the neighboring cell. For example, one bit is used. When a value is 0, it indicates that the time resource information is based on the current cell; or when a value is 1, it indicates that the time resource information is based on the neighboring cell. In the manner (a), alternatively, the reference information may be specifically understood as whether an SS block indicated in the time resource information is an SS block of the current cell or an SS block of the neighboring cell. For example, as shown in the examples in FIG. 6 and FIG. 8, the time resource information may include SS block information (may be an SS block time index) and/or an offset delta. Further, it can be learned, with reference to the reference information, whether the SS block in the time resource information is an SS block of the current cell or an SS block of the neighboring cell. In FIG. 6 and FIG. 8, the first symbol of the SS block is used as a start location of the delta. However, a person skilled in the art knows that in implementation, the start location may be not limited to the first symbol, and the last symbol or any intermediate symbol may be used as the start location.

(b) Added description is provided as follows:

For the original paragraph:

"(b) The time resource information may be a time boundary of the current cell. A granularity of the time boundary may be a frame boundary, a subframe boundary, a slot boundary, or a symbol boundary, or may be a boundary of an SS block of the current cell. The granularity may be the foregoing various granularities. For example, The boundary of the SS block may be the first symbol, the last symbol, the first subframe, the last subframe, or the like of the SS block. The time offset may be at a symbol level, for example, 10 symbols, or may be at a slot level or a subframe level, for example, two subframes".

The original paragraph may be understood and described as follows:

(b) The time resource information may be a time offset corresponding to a subframe of the CSI-RS. The time resource information may be based on a time boundary of the current cell or based on a time boundary of the neighboring cell. A granularity of the time boundary may be a frame boundary, a subframe boundary, a slot boundary, or a symbol boundary. The granularity may be the foregoing various granularities. The time offset may be at a symbol level, for example, 10 symbols, or may be at a slot level or a subframe level, for example, two subframes. The reference signal notification message may further include reference information used to indicate a reference of the time resource information. For example, the reference information is used to indicate whether the time resource information is based on the current cell or the neighboring cell. For example, one bit is used. When a value is 0, it indicates that the time resource information is based on the current cell; or when a value is 1, it indicates that the time resource information is based on the neighboring cell. In the manner (b), alternatively, the reference information may be specifically understood as whether a frame, a subframe, a slot, or a symbol indicated in the time resource information is a frame, a subframe, a slot, or a symbol of the current cell, or a frame, a subframe, a slot, or a symbol of the neighboring cell. For example, the time resource information may include an offset (which may be represented as a delta) and information about a frame, a subframe, a slot, or a symbol. Further, it can be learned, based on the reference information, whether the frame, the subframe, the slot, or the symbol indicated in the time resource information is a frame, a subframe, a slot, or a symbol of the current cell, or a frame, a subframe, a slot, or a symbol of the neighboring cell.

For the third type of time resource information:

Added description is provided as follows:

The reference signal notification message may further include reference information used to indicate a reference of the time resource information. For example, the reference information is used to indicate whether the time resource information is based on the current cell or the neighboring cell. For example, one bit is used. When a value is 0, it indicates that the time resource information is based on the current cell; or when a value is 1, it indicates that the time resource information is based on the neighboring cell. In the measurement window manner, as shown in the example in FIG. 7, the time resource information may be an offset delta. Certainly, for a value of a quantity of SS blocks, the offset delta is optional and may be or may not be a part of the time resource information. For example, in FIG. 7, n is 3. For example, with reference to FIG. 7 and the reference information, it may indicate whether an SS block used for measurement window-based calculation is an SS block of the current cell or an SS block of the neighboring cell.

For all the forms of the time resource information, optionally, the reference signal notification message may include the reference information. In implementation, the reference information may be separated from the reference signal notification message. For example, the reference information is carried in another message (which is, for example, named a first message) sent by the network device, for example, a broadcast message or a system message.

Optionally, the reference information may be classified into the reference information in which the current cell is used as a reference or the reference information in which the neighboring cell is used as a reference. Optionally, if a network system is a synchronous network, a time difference (English: time difference) between network devices may be less than a length of a CP, and therefore the reference information may indicate that the time resource information is based on the current cell. Optionally, if a network system is an asynchronous network, a time difference between network devices may be greater than a length of a CP, and therefore the reference information may indicate that the time resource information is based on the neighboring cell. Certainly, if the network system is an asynchronous network, the reference information may alternatively indicate that the time resource information is based on the current cell. In this case, the reference signal notification message or the another message (which is, for example, named the first message) sent by the network device, for example, the broadcast message or the system message, may further include a time difference between the current cell and the neighboring cell, so that after receiving the time difference between the neighboring cell and the current cell, the UE obtains a time location of the reference signal based on the time resource information and the reference information, to receive the reference signal.

Supplementary description of the embodiment of the apparatus 1100 is as follows:

The reference signal notification message further includes reference information used to indicate whether the time resource information is based on the current cell or the neighboring cell.

Optionally, the transceiver is further configured to send a first message. The first message may be a broadcast message. The first message, for example, the broadcast message, includes the reference information used to indicate whether the time resource information is based on the current cell or the neighboring cell.

For description of the reference information, refer to the description in the foregoing embodiments. Details are not described again.

Supplementary description of the embodiment of the apparatus 1200 is as follows:

The reference signal notification message further includes reference information used to indicate whether the time resource information is based on the current cell or the neighboring cell.

Optionally, the transceiver is further configured to receive a first message. The first message may be a broadcast message. The first message, for example, the broadcast message, includes the reference information used to indicate whether the time resource information is based on the current cell or the neighboring cell.

For description of the reference information, refer to the description in the foregoing embodiments. Details are not described again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

It should be understood that the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present invention may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. An apparatus, comprising at least one processor, configured to execute instructions in a memory to cause the apparatus to perform the following:
   sending a reference signal notification message, wherein the reference signal notification message comprises time resource information of a reference signal, wherein the reference signal is a channel state information reference signal (CSI-RS) for mobility measurement, wherein the reference signal notification message further comprises a cell identity and numerology information of the CSI-RS, and wherein the reference signal notification message further comprises associated synchronization signal (SS) block time index.

2. The apparatus according to claim 1, wherein:
   the time resource information is at least one of subframe configuration information, a time offset, or measurement window information of the CSI-RS.

3. The apparatus according to claim 1, wherein the reference signal notification message further comprises:
   beam information of the CSI-RS, wherein the beam information is information of a synchronization signal (SS) block.

4. The apparatus according to claim 3, wherein the reference signal notification message further comprises one or more pieces of the following information:
   periodicity information corresponding to a subframe of the CSI-RS, bandwidth information of the CSI-RS, antenna port information of the CSI-RS, or time-frequency resource mapping relationship information of the CSI-RS.

5. The apparatus according to claim 1, wherein the reference signal notification message further comprises: periodicity information of the CSI-RS.

6. The apparatus according to claim 1, wherein the numerology information comprises a subcarrier spacing.

7. The apparatus according to claim 6, wherein the subcarrier spacing is 15 kHz, 30 kHz, 60 kHz, or 120 kHz.

8. The apparatus according to claim 1, wherein the reference signal notification message is sent by a network device or a chip for the network device to a terminal device being in a connection state.

9. The apparatus according to claim 8, wherein the network device corresponds to a current cell of the terminal device, or, a neighboring cell of a current cell of the terminal device.

10. The apparatus according to claim 1, wherein the reference signal notification message further comprises reference information that indicates a serving cell that the time resource information is based on.

11. An apparatus, comprising at least one processor, configured to execute instructions in a memory to cause the apparatus to perform the following:
receiving a reference signal notification message, wherein the reference signal notification message comprises time resource information of a reference signal, wherein the reference signal a channel state information reference signal (CSI-RS) for mobility measurement, wherein the reference signal notification message further comprises a cell identity and numerology information of the CSI-RS, and wherein the reference signal notification message further comprises associated synchronization signal (SS) block time index.

12. The apparatus according to claim 11, wherein:
the time resource information is at least one of subframe configuration information, a time offset, or measurement window information of the CSI-RS.

13. The apparatus according to claim 11, wherein the reference signal notification message further comprises: beam information of the CSI-RS, wherein the beam information is information of a SS block.

14. The apparatus according to claim 13, wherein the reference signal notification message further comprises one or more pieces of the following information:
periodicity information corresponding to a subframe of the CSI-RS, bandwidth information of the CSI-RS, antenna port information of the CSI-RS, or time-frequency resource mapping relationship information of the CSI-RS.

15. The apparatus according to claim 11, wherein the reference signal notification message further comprises: periodicity information of the CSI-RS.

16. The apparatus according to claim 11, wherein the numerology information comprises a subcarrier spacing.

17. The apparatus according to claim 16, wherein the subcarrier spacing is 15 kHz, 30 kHz, 60 kHz, or 120 kHz.

18. The apparatus according to claim 11, wherein the reference signal notification message is received by a terminal device or a chip for the terminal device from a network device, wherein the terminal device is in a connection state.

19. The apparatus according to claim 18, wherein the network device corresponds to a current cell of the terminal device, or, a neighboring cell of a current cell of the terminal device.

20. The apparatus according to claim 11, wherein the reference signal notification message further comprises reference information that indicates a serving cell that the time resource information is based on.

* * * * *